UNITED STATES PATENT OFFICE.

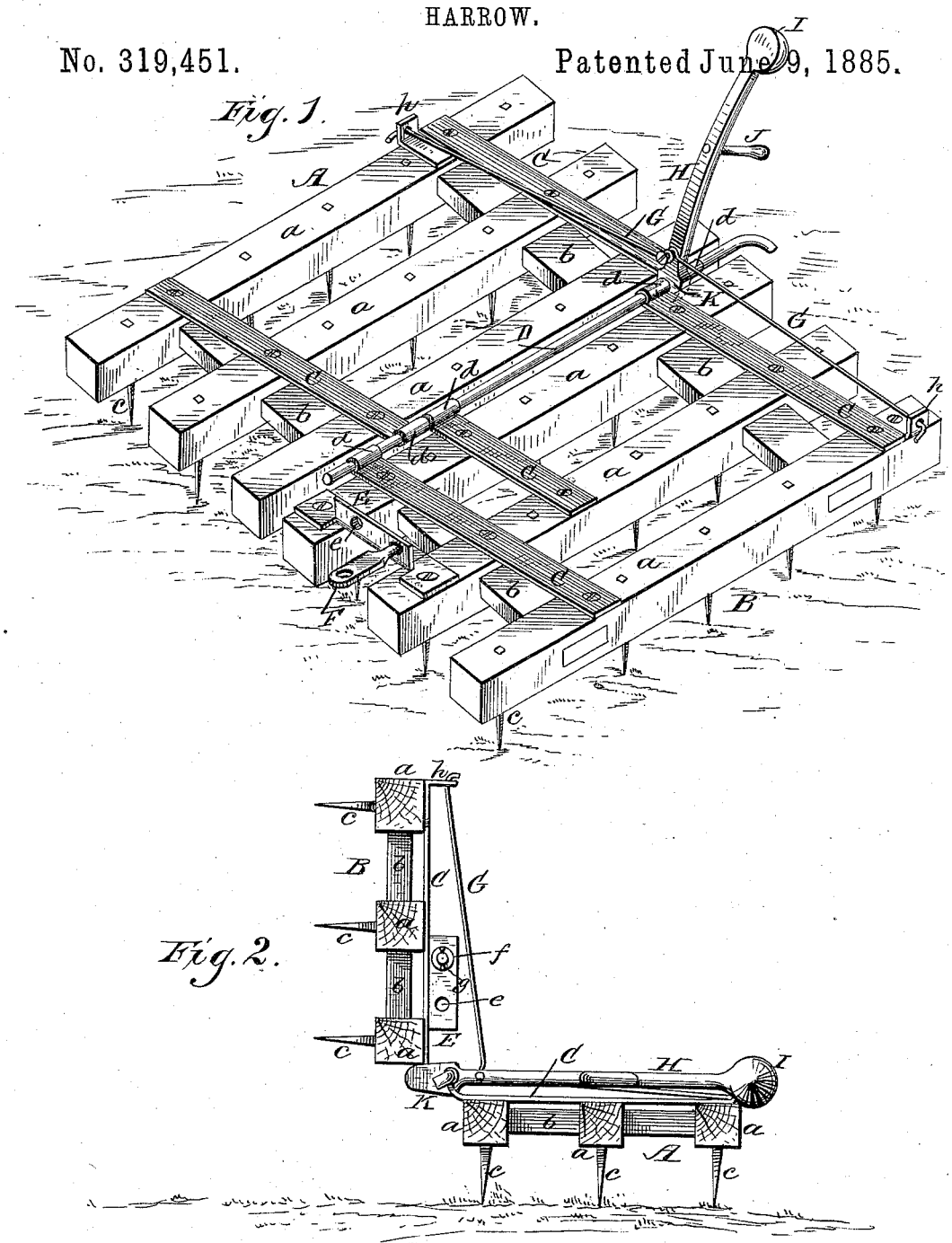

ASA CARLIN, OF GONTEN, MISSOURI.

HARROW.

SPECIFICATION forming part of Letters Patent No. 319,451, dated June 9, 1885.

Application filed March 20, 1885. (No model.)

*To all whom it may concern:*

Be it known that I, ASA CARLIN, a citizen of the United States, residing at Gonten, in the county of Barry and State of Missouri, have invented certain new and useful Improvements in Harrows; and I do hereby declare that the following is a full, clear, and exact description of the same, reference being had to the annexed drawings, making a part of this specification, and to the letters and figures of reference marked thereon.

Figure 1 of the drawings is a perspective view of my improved harrow; and Fig. 2, an end view thereof, showing one of the harrow sections or wings in an elevated position.

The present invention has relation to certain new and useful improvements in that class of harrows consisting of two or more hinged sections or wings; and the object thereof is to provide simple and effective means whereby the operator is enabled to elevate either of the hinged sections or wings while the harrow is in motion, in order to facilitate the passing of obstructions and through gates, and also to enable the operator, when desired, to double the harrow by bringing one section or wing down upon the other, thus increasing the weight on the ground covered, and for the additional purpose of loading in a wagon. These objects I attain by the construction substantially as shown in the drawings and hereinafter described and claimed.

In the accompanying drawings, A B represent the two sections or wings of the harrow, composed of the parallel beams $a$, connected together by transverse braces $b$, passing through rectangular holes in said beams, thus firmly holding them together the required distance from each other. The beams $a$ are provided upon their under side with the usual harrow-teeth, $c$, and upon their upper side have suitably-fastened strap-irons C, terminating at their inner ends in eyes $d$, through which passes a removable rod, D, thus forming a hinged connection for the two sections or wings A B, in such manner as to allow them to be folded down upon each other.

To the forward end of the section or wing B is secured an upright plate, E, provided with two or more perforations, $e$, to receive the shank of a suitable clevis, F, for attaching thereto the double-tree, a swivel-connection being formed between the clevis and plate.

To the outer ones of the beams $a$, and at the rear ends thereof, are secured eye-plates $h$, through which loosely pass rods G, which are bent at their outer ends to retain them in engagement with the plates. The inner ends of the rods G are suitably connected to an upright lever, H, said lever having its upper end weighted, as shown at I, and is also provided with a handle, J, at right angles thereto.

The lower end of the lever H is connected to the rod D, the rod passing loosely through a perforation therein, so as to form a pivotal connection between the two, the rod forming a fulcrum for the lever.

The extremity of the lever H below the rod D terminates in a dog, K, to bear against either side of the inner ones of the beams $a$, when desired to raise either of the sections or wings A B by the action of the lever. The dog K is preferably formed with curved sides and end, so as not to cut or injure the wood of the harrow-beams.

When it is desired to elevate either one of the harrow-sections A B, the operator takes hold of the handle J and brings the lever H in the proper position, so that the dog K will bear against the side of the inner beam of the harrow section or wing desired to be elevated. This being done, the lever H is further depressed, which will elevate the section or wing of the harrow, the weight I assisting in carrying it to the position required, either folding it down upon its fellow section or wing, or simply elevating it to pass over obstructions.

The rods G, which connect the lever H with the outer beams of each of the harrow sections or wings, act as a lift to assist in elevating them.

Having now fully described my invention, what I claim as new, and desire to secure by Letters Patent, is—

1. In a harrow, the combination, with the two hinged sections thereof, of a pivoted lever terminating below its pivotal connection with a dog to bear against the inner sides of the section when elevating them, substantially as and for the purpose set forth.

2. In a harrow, the combination, with the two hinged sections thereof, of a pivoted and weighted lever provided with a handle at right angles thereto for operating it in elevating the sections, substantially as and for the purpose described.

3. In a harrow, the combination, with the hinged sections thereof, of a pivoted and weighted lever terminating below its pivotal connection in a dog to bear against the inner side of the sections when elevating them, substantially as and for the purpose set forth.

4. In a harrow consisting of hinged sections, the combination, with a pivoted lever provided with a weight and handle, and terminating at its lower end in a dog, of two lift-rods connected to the lever and to the sections, substantially as and for the purpose described.

In testimony that I claim the above I have hereunto subscribed my name in the presence of two witnesses.

ASA CARLIN.

Witnesses:
 GEO. H. HILL,
 A. F. CHASE.